United States Patent
He et al.

(10) Patent No.: US 10,364,096 B2
(45) Date of Patent: Jul. 30, 2019

(54) BASE PLATE UNIT

(71) Applicants: NanTong CIMC ECO New Materials Development CO., LTD., Nantong (CN); CIMC CONTAINER HOLDINGS LIMITED CO., LTD., Dongguan (CN); CHINA INTERNATIONAL MARINE CONTAINERS (GROUP) LTD., Shenzhen (CN)

(72) Inventors: Shuang He, Jiaxing (CN); Fuyou Wang, Nantong (CN); Wen Peng, Nantong (CN)

(73) Assignees: Nantong CIMC ECO New Materials Development CO., Ltd., Nantong, Jiangsu (CN); CIMC CONTAINER HOLDINGS LIMITED CO., LTD., Dongguan, Guangdong (CN); CHINA INTERNATIONAL MARINE CONTAINERS (GROUP) LTD., Shenzhen, Guangdong (CN)

( * ) Notice: Subject to any disclaimer, the term of this patent is extended or adjusted under 35 U.S.C. 154(b) by 182 days.

(21) Appl. No.: 15/536,355

(22) PCT Filed: Nov. 20, 2015

(86) PCT No.: PCT/CN2015/095081
§ 371 (c)(1),
(2) Date: Jun. 15, 2017

(87) PCT Pub. No.: WO2016/095652
PCT Pub. Date: Jun. 23, 2016

(65) Prior Publication Data
US 2018/0327180 A1    Nov. 15, 2018

(30) Foreign Application Priority Data
Dec. 15, 2014  (CN) .......................... 2014 1 0775740

(51) Int. Cl.
| | |
|---|---|
| B65D 90/12 | (2006.01) |
| F16S 1/10 | (2006.01) |
| B62D 25/20 | (2006.01) |
| E04C 2/20 | (2006.01) |
| E04C 2/22 | (2006.01) |

(52) U.S. Cl.
CPC ......... *B65D 90/12* (2013.01); *B62D 25/2054* (2013.01); *E04C 2/20* (2013.01); *E04C 2/22* (2013.01); *F16S 1/10* (2013.01)

(58) Field of Classification Search
CPC ....... B65D 90/12; F16S 1/10; B62D 25/2054; E04C 2/20; E04C 2/22
See application file for complete search history.

(56) References Cited

U.S. PATENT DOCUMENTS

| | | |
|---|---|---|
| 7,575,264 B1 | 8/2009 | Solomon |
| 2006/0048311 A1 | 3/2006 | Lee |

FOREIGN PATENT DOCUMENTS

| | | |
|---|---|---|
| CN | 201173378 Y | 12/2008 |
| CN | 201296480 Y | 8/2009 |

(Continued)

OTHER PUBLICATIONS

The EESR dated Nov. 30, 2018 by the EP Office.
(Continued)

*Primary Examiner* — Michael C Miggins
(74) *Attorney, Agent, or Firm* — Yunling Ren

(57) ABSTRACT

Provided is a base plate unit, which is of an integrated structure made of fiber reinforced polymer-matrix composite and comprises a base plate unit body and foot plates. The base plate unit body comprises at least one bearing part, each bearing part comprising a panel, a plurality of web plates extending downwards from the bottom of the panel, and bottom supports disposed at the lower end of the web plates. The web plates comprise two side-web plates on the two sides of the panel and a middle web plate in the middle. The (Continued)

foot plates are disposed on the two outer sides of the bottom of the base plate unit body, and are formed by the bottoms of the two side-web plates on the outmost side of the base plate unit body respectively extending outwards horizontally. Also provided is a base plate unit provided with a cavity filling member.

26 Claims, 17 Drawing Sheets

(56) References Cited

FOREIGN PATENT DOCUMENTS

| CN | 102616504 A | 8/2012 |
|---|---|---|
| CN | 102912965 A | 2/2013 |
| CN | 103031808 A | 4/2013 |
| CN | 202990353 U | 6/2013 |
| CN | 204312984 U | 5/2015 |
| CN | 204437667 U | 7/2015 |
| DE | 202013102695 U1 | 7/2013 |
| DE | 102012206171 A1 | 9/2013 |
| EP | 1123771 A | 8/2001 |
| FR | 2125109 A1 | 9/1972 |
| JP | H08268344 A | 10/1996 |
| JP | 2014034212 A | 2/2014 |
| WO | 0174688 A1 | 10/2001 |

OTHER PUBLICATIONS

PCT Search Report dated Jun. 23, 2016 by the WIPO Office.
The CN1OA dated Aug. 2, 2017 by the CNIPA.
The CN3OA dated Sep. 27, 2018 by the CNIPA.

US 10,364,096 B2

BASE PLATE UNIT

CROSS REFERENCE

The present application is a national phase of PCT Application No. PCT/CN2015/095081, filed on Nov. 20, 2015, which claims the priority to Chinese Application No. 201410775740.2, filed on Dec. 15, 2014, the contents of both of which are hereby incorporated by reference herein in their entireties.

TECHNICAL FIELD

The disclosure relates to a base plate, and more specifically, to a base plate unit made of composite material which is applicable to many fields, such as various containers, vehicle, ship, energy and chemical engineering, marine engineering, etc.

BACKGROUND

The fiber reinforced plastic (i.e., FRP) can satisfy product requirements for great span, high load, high-mechanic strength, and light weight under severe condition in modern times due to its high strength rate, high modulus rate, devisable of material property, corrosion resistance, durability, etc. Therefore, FRP has been increasingly and widely applied to various structural fields, such as civil architecture, bridge, transportation, marine engineering. There are previous examples that high-strength profile structures made of FRP have been applied to main bearing members in the areas of container, vehicle, ship, energy and chemical engineering, marine engineering, etc. For example, base plate may be made of FRP, and may substitute traditional wooden plywood, solid wood integrated base plate, bamboo-wood composite base plate or steel base plate. However, to get a better balance between cost and performance is an important problem crying to be solved, while using FRP to make a base plate.

SUMMARY

The objective of the disclosure is to provide a base plate unit to achieve a good comprehensive performance with a low cost.

To address the above technical problems, the disclosure provides a base plate unit wherein the base plate unit is of an integral structure made of fiber reinforced polymer-matrix composite and the base plate unit comprises:

a base plate unit body comprising at least one bearing part, each bearing part comprising a panel, a plurality of web plates extending downwards from a bottom of the panel, and bottom supports disposed at lower ends of the web plates, the web plates comprising two side-web plates at both sides of the panel and middle web plates in the middle;

foot plates disposed at both exterior sides of a bottom of the base plate unit body, and formed by extending bottoms of respective outmost side-web plates of the base plate unit body outwards horizontally;

wherein a width of the panel of each bearing part is 50 to 450 mm, and a thickness of the panel is 3 to 8 mm; a thickness of each of the side-web plates and the middle web plates is 4 to 7 mm; a thickness of the foot plate is 3 to 7 mm, and a width of the foot plate is 15 to 40 mm.

In an embodiment of the present disclosure, the base plate unit body comprises a plurality of bearing parts arranged transversally at intervals, and bottom ends of the side-web plates of adjacent bearing parts are connected integrally by a bottom connecting plate, which together with the side-web plates of adjacent bearing parts enclose a groove that is filled a groove fixing member.

In an embodiment of the present disclosure, a width of the groove fixing member is 30 to 150 mm.

In an embodiment of the present disclosure, outer surfaces of the two side-web plates of the bearing part are vertical planes, or inclined planes which are inclined gradually outwards from top to bottom, and an inclination angle of the outer surfaces of the side-web plates is 0 to 15° relative to the vertical plane.

In an embodiment of the present disclosure, the inclination angle of the outer surfaces of the side-web plates is 0 to 8° relative to the vertical plane.

In an embodiment of the present disclosure, the bottom supports are foot supports comprising a plurality of side-foot supports formed by extending a bottom of each side-web plate inwards horizontally; and a plurality of middle foot supports formed by extending a bottom edge of each middle web plate towards both sides horizontally, lower surfaces of foot supports being flush with lower surfaces of foot plates, and a width of the middle foot support is 10 to 30 mm, a thickness of each of the side-foot supports and the middle foot supports is 4 to 6 mm.

In an embodiment of the present disclosure, wherein the width C of the middle foot support is 15 to 25 mm, the thickness of each of the side-foot supports and the middle foot supports is 4.5 to 5 mm.

In an embodiment of the present disclosure, the width F of the panel is 200 to 300 mm, and the thickness A of the panel is 4 to 5 mm; the thickness B of each of the side-web plates and the middle web plate is 4 to 6 mm; the thickness G of the foot plate is 3 to 5 mm, and the width E of the foot plate is 15 to 28 mm.

In an embodiment of the present disclosure, the bottom supports are planar supports that are connected to both foot plates to form an integral structure, lower ends of the middle web plates are connected to the planar supports, and a thickness of the planar support is 4 to 6 mm.

In an embodiment of the present disclosure, the thickness of the planar support is 4.5 to 5 mm.

In an embodiment of the present disclosure, an interval between two adjacent web plates is 30 to 100 mm.

According to the above technical solution, the advantages and the positive effects of the present invention includes that the base plate unit may achieve an excellent effect combining the cost and load considerations by the cooperation of the structures and shapes of the various portions of the bearing parts of the base plate unit and the cooperation of the their dimension parameters.

To address the above technical problems, the disclosure provides a base plate unit comprising:

a base plate unit body comprising at least one bearing part, each bearing part comprising a panel and two side-web plates extending downwards from a bottom of the panel, the panel and the side-web plates forming a cavity;

foot plates disposed at both exterior sides of a bottom of the base plate unit body, and formed by extending bottoms of respective outmost two side-web plates of the base plate unit body outwards horizontally, lower surfaces of the foot plates being flush with lower surfaces of the bottom supports; and a cavity filling mounted in the cavity of the base plate unit body;

wherein the base plate unit body and the foot plates are formed integrally and are made of fiber reinforced polymer-matrix composite, the cavity filling being formed separately.

In an embodiment of the present disclosure, the base plate unit body comprises a plurality of bearing parts arranged transversally at intervals, and bottom ends of the side-web plates of adjacent bearing parts are integrally connected by a bottom connecting plate, which together with the side-web plates of adjacent bearing parts enclose a groove that is filled a groove fixing member.

In an embodiment of the present disclosure, a width of the groove fixing member is 30 to 150 mm.

In an embodiment of the present disclosure, an inclination angle of the outer surfaces of the two side-web plates of the bearing part is 0 to 15° relative to a vertical plane, and the outer surface is inclined gradually outwards from top to bottom.

In an embodiment of the present disclosure, the inclination angle of the outer surfaces of the side-web plates is 0 to 8° relative to the vertical plane.

In an embodiment of the present disclosure, foot supports are disposed at inner sides of bottom ends of the side-web plates, which are formed by extending bottoms of the side-web plates inwards horizontally; the two foot supports have interval to form an opening at the bottom of the cavity; the cavity filling supports a lower surface of the panel, and a lower surface of the cavity filling is flush with lower surfaces of foot supports.

In an embodiment of the present disclosure, the cavity filling is an I-shaped support beam comprising an upper flange, a lower flange and a vertical plate connecting the upper flange and the lower flange, the upper flange supporting the lower surface of the panel, the cavity filling made of metal or composite material.

In an embodiment of the present disclosure, a foam or elastomer is disposed between a top surface of the upper flange and the panel.

In an embodiment of the present disclosure, a width of the upper flange is 15 to 150 mm.

In an embodiment of the present disclosure, a planar support is connected between the bottom ends of the two side-web plates of the bearing part and is connected to the two foot plates to form an integral structure, and the planar support, the side-web plates and the panel enclose the cavity.

In an embodiment of the present disclosure, the cavity filling comprises a plurality of longitudinal beams and transversal beams transversally connecting the longitudinal beams, and a top surface and lower surface of each longitudinal beam are in contact with a lower surface of the panel and the planar support respectively.

In an embodiment of the present disclosure, the transversal beams are connected to ends of the longitudinal beams, and both ends of the transversal beam abut against the two web plates of the bearing part.

In an embodiment of the present disclosure, the cavity filling is made of wood.

In an embodiment of the present disclosure, the cavity filling is made of wood, plastic, metal or composite material.

In an embodiment of the present disclosure, the material of the cavity filling is distinct from the material of the base plate unit body.

According to the above technical solution, the advantage and the good effect of the disclosure is that: a cavity filling separated from a base plate unit body is used to provide support and is made of scraps material or low cost material.

The base unit body has a simple structure, which is easy to be processed and molded in a low cost but a high bearing capability.

Figure 1:
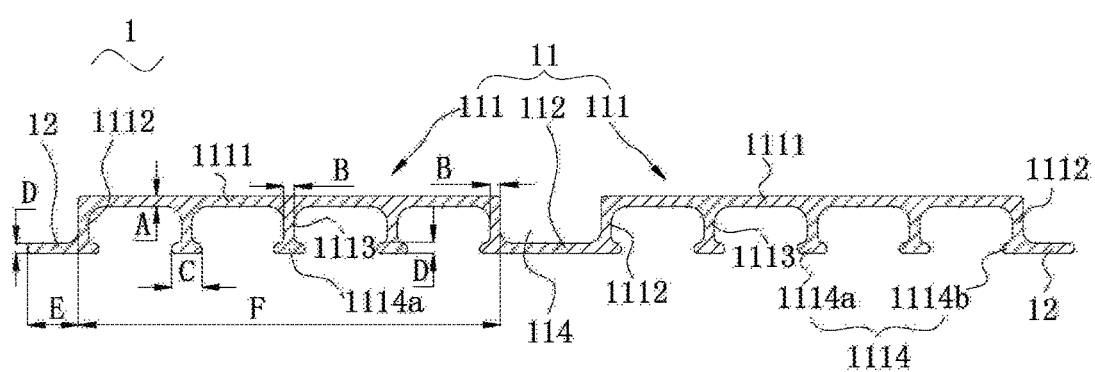
FIG. 1 is a schematic view of a base unit according to a first embodiment of the present disclosure.

NUMERAL SIGN LIST 1. base plate unit; 11. base plate unit body; 111. bearing part; 1111. panel; 1112. side-web plate; 1113. middle web plate; 1114. bottom support; 1114a. side-foot support; 1114b. middle foot support; 1114c. planar support; 1116. cavity; 112. bottom connecting plate; 114. groove; 12. foot plate; 14. accommodating groove; 15. cavity filling; 151. longitudinal beam; 153. upper flange; 154. lower flange; 155. vertical plate; 2. first groove fixing member; 21. sealing member; 3. side fixing member; 4. second groove fixing member; 6. end filling.

DETAILED DESCRIPTION

Specific embodiments embodying features and advantages of the disclosure have been described in detail hereinafter. It should be understood that modifications can be made to the disclosure in different embodiments, without departing from the scope of the disclosure, and the description and drawings thereof should be substantively regarded to be illustrative rather than limitative.

The present disclosure provides a base plate unit, which can be spliced as a base plate member in transversal direction, and which is fixed to each other by a first groove fixing member. The base plate member formed by base plate units can be applicable to many fields, such as various containers, vehicle, ship, energy and chemical engineering, marine engineering, etc. The term "transversal direction" means the width direction of the base plate unit.

The body of the base plate unit is made of fiber reinforced polymer-matrix composite material, taking good advantage of its high strength, low modulus, etc. The surface of the base plate unit may present various functions, such as wear resistance, ant slip, shock resistance, anti-pollution, moisture proof, acid resistance and alkali resistance, by spraying polyurethane, polyurethane (urea) or polyurea thereon. The fiber reinforced polymer-matrix composite material for the base plate unit is made of high strength and high modulus fiber as reinforcement and resin as the matrix. The reinforcement may be one or more of fiberglass, carbon fiber, aramid fiber and other natural fiber. The matrix may be one or more high polymer materials of unsaturated polyester resin, vinyl resin, epoxy resin and polyurethane.

The first groove fixing member is made of one or more of wood (including solid wood integrated base plate, bamboo-wood composite plate, composite plate formed by oriented strandboard and artificial wood veneer, special paywood, etc.), plastic, metal and thermoplastic composite. The surfaces of the first groove fixing member may be treated by spraying water-based environmental paint, polyurethane, polyurethane (urea) or polyurea.

When the base plate member is in use, all base plate units are disposed on a base frame, and the first groove fixing members are disposed above the base plate units without contacting the base frame. The first groove fixing member and the base plate units are fixed to the base frame by passing screws through the first groove fixing member and the base plate units, so that all base plate units and the base frame can be fixed stably by fully utilizing a strong nail-holding ability of the first groove fixing member on the screws. There is a cavity, for example, between two ends, i.e., in length direction, of the base plate member and the base frame, which may be filled by end fillings that are made of wood, plastic, metal or thermoplastic composite. Two side parts of the base plate member may be fixed to the base frame by side fixing members.

In consideration of performance and cost of the base plate unit, this disclosure provides various base plate units with low cost and high bearing capacity, which have been described in following embodiments.

First Embodiment

Referring to FIG. 1, according to this embodiment, a base plate unit 1 includes a base plate unit body 11 and foot plates 12 extending transversally from two sides of bottom of the base plate unit body 11. The foot plates 12 are connected to side surfaces of the base plate unit body 11 by an arc transition. The base plate unit 1 has an integral structure.

The base plate unit body 11 of the base plate unit 1 includes two bearing parts 111 disposed transversally, each of which includes a panel 1111, a plurality of web plates extending downwards from bottom of the panel 1111, and bottom supports 1114 disposed at the lower ends of the web plates. The web plates includes two side-web plates 1112 located on two sides of the panel 1111 and middle web plates 1113 located in the middle. The bottom supports 1114 are foot supports, which includes a plurality of side-foot supports 1114a and a plurality of middle foot supports 1114b. The side-foot supports 1114a, formed by extending the bottoms of the side-web plates 1112 inwards in the horizontal direction, has the same number as the side-web plates 1112. The middle foot supports 1114b, formed by extending bottom edges of the middle web plates 1113 horizontally on both sides, has the same number as the middle web plates 1113.

As for the bearing part 111, its panel 111 is a pressure structure, its web plates have high shear strength and compression strength, and its bottom supports 1114 have great tensile strength, which not only utilizes the mechanical properties of composite material at uttermost, but also reduces total density and material cost of the base plate unit 1 effectively.

The two bearing parts 111 are integrated at bottom end of one side-web plate 1112 through a bottom connecting plate 112, so that a groove 114 is formed between the bottom connecting plate 112 and the side-web plates of the adjacent bearing parts 111. A second groove fixing member 4 may be disposed in the cavity 114 (see FIG. 2). The bottom connecting plate 112 is fixed to the base frame by screws passing through the second groove fixing member 4 and the bottom connecting plate 112.

The base plate unit body 11 may also comprise three or more bearing parts 111 according to an extension from the connection means between the two bearing parts 111 of the base plate unit body 11, so that a plurality of bearing parts 111 can form an integral structure, which not only improves the strength of the whole base plate unit 1, but also improves the productivity. The number of groove 114 on each base plate unit 1 should be 1 to 5, that is, there are 2 to 6 bearing parts 111 on each base plate unit 1, and the width of the groove 114 is 30 to 150 mm. Accordingly, the width of the second groove fixing member 4 adapted to the groove 114 is 30 to 150 mm.

The foot plates 12 of the base plate unit 1 are formed by horizontally extending the respective bottoms of the outmost side-web plates 1112 of the base plate unit body 11 outwardly, and lower surfaces of the foot plates 12 and the bottom supports 1114 are flush with the lower surface of the bottom connecting plates 112.

The number and pitch of the web plate or the total thickness of the profile may be adjusted to satisfy the demands of size and strength, varying according to different application fields or under different load requirements of the base plate unite 1. The total number of the web plates may be set to 3 to 20, depending on the width of the bearing part 111, and the interval between two adjacent web plates may be 30 to 100 mm, the total thickness of the profile may be 10 to 70 mm.

According to the finite element analysis of the base plate unit 1, under an invariable total thickness condition, reducing weight may be accomplished by reducing the thickness of the panel, which has an influence on performances of the panel within 3%. The bearing capacity can be enhanced by increasing the whole thickness, the width and/or thickness of the foot plates and the thickness of the web plates. After a comprehensive analysis, it is found that the base plate unit 1 can achieve a maximal weight-reduction effect, while satisfying the demand of bearing capacity, by setting the parameters of sections of the base plate within the following range. A thickness A of panel 111 of each bearing part 111 is 3 to 8 mm; a thickness B of each of the side-web plate 1112 and middle web plate 1113 is 4 to 7 mm; a width C of the foot support is 10 to 30 mm, a thickness D of the foot support is 4 to 6 mm; a thickness G of the foot plate 12 is 3 to 7 mm, a width E of the foot plate 12 is 15 to 40 mm. The bearing parts 111 can achieve a higher bearing capacity with a lower cost through particular designs of these dimensions. In addition, because the first groove fixing member 2 or the second groove fixing member 4 is necessary to fix the base plate unit 1 to the base frame during the mounting, the width F of the panel 111 of each bearing part 111 of the base plate unit 1 according to the disclosure is preferably 50 to 450 mm, in order to effectively fix the base plate unit 1.

In view of the cost and performance, the preferable dimensions of the sections of the bearing part 111 are as following: the width F of the panel 1111 of the bearing part 111 is 200 to 300 mm, the thickness A of panel 1111 is 4 to 5 mm; the thickness B of each of the side-web plates 1112 and the middle web plates 1113 is 4 to 6 mm; the width C of the foot support is 15 to 25 mm, the thickness D of the foot support is 4.5 to 5 mm; the thickness G of the foot plate 12 is 3 to 5 mm, the width E of the foot plate 12 is 15 to 28 mm.

According to the above preferable parameter ranges of the base plate unit 1, the finite element analysis and related structural tests have been done for some structures having typical parameters in this disclosure, and parameters of the structures are shown in below sheet.

| | Structural parameters | | | | |
|---|---|---|---|---|---|
| Item | Thickness of panel A/mm | Thickness of web plate B/mm | Thickness of foot plate G/mm | Width of foot plate E/mm | Interval between web plates/mm |
| Structure 1 | 5.5 | 4.5 | 6 | 15 | 46 |
| Structure 2 | 6 | 4 | 5 | 15 | 46 |
| Structure 3 | 5 | 5 | 5.5 | 15 | 50 |
| Structure 4 | 4.5 | 5 | 5 | 15 | 50 |
| Structure 5 | 4 | 6 | 4 | 20 | 52 |
| Structure 6 | 4 | 5.5 | 5 | 22 | 52 |

The results of the finite element analysis and test of the above structures are shown in below sheet, wherein the loading condition in the computed results of the finite element analysis are: applied load 65 KN, support span 310 mm.

| | Computed results of the finite element analysis | | Test results | | | | |
|---|---|---|---|---|---|---|---|
| Item | Maximum strain/mm | Maximum stress/Mpa | Value of pressed block | Bending strength/ Mpa | Static bending intensity/MPa | Elastic modulus/ Mpa | Density of base plate/g/cm$^3$ |
| Structure 1 | 8.852 | 570.60 | 2.37 | 146.1 | 129 | 11553 | 0.73 |
| Structure 2 | 9.507 | 593.76 | — | — | — | — | — |
| Structure 3 | 8.288 | 547.91 | 2.46 | 150.4 | 147 | 10996 | 0.69 |
| Structure 4 | 8.559 | 555.39 | — | — | — | — | — |
| Structure 5 | 8.617 | 515.11 | 2.83 | 165.1 | 206 | 14061 | 0.65 |
| Structure 6 | 8.774 | 518.53 | — | — | — | — | — |

The finite element analysis and the practical test results of the structures 1 to 6 show that all use requirements are satisfied and a better weight-reduction effect can be achieved when satisfying the bearing capacity. Roughly, the effects become gradually better from structures 1 to 6.

Figure 2:
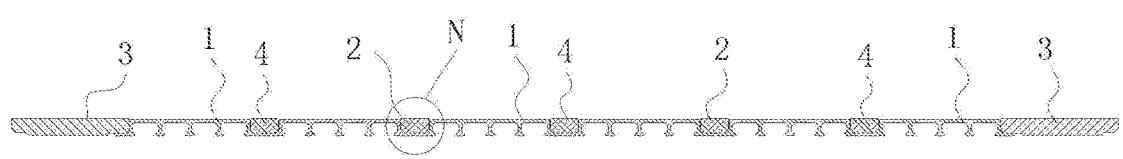
FIG. 2 is a schematic view showing the base units according to the first embodiment of the present disclosure being spliced as a base plate member.

Referring to FIG. 2, in one embodiment, a base plate component is formed by matching three base plate units 1 according to the embodiment transversally in order. Two first groove fixing members 2 are correspondingly disposed among the three base plate units 1. The second groove fixing member 4 is further disposed on the middle of each base plate unit 1. The side fixing members 3 are disposed on the two sides of the base plate member.

Figure 3:
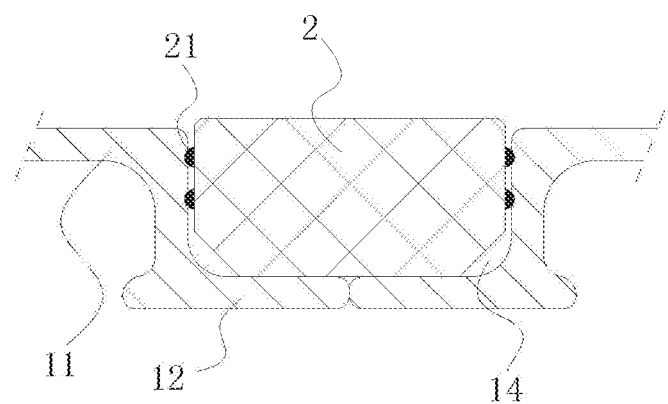
FIG. 3 is an enlarged partial view showing a portion N in FIG. 2 of the present disclosure.

Referring to FIG. 3, foot plates 2 of the two adjacent base plate units 1 abut against each other, which form an accommodating groove 14 together with side surfaces of the two base plate unit bodies 11. Preferably, the foot plates 12 of the two adjacent base plates 1 have the same thickness, so that the upper surfaces of the two abutting foot plates 12 are flush.

The first groove fixing member 2 is mounted in the accommodating groove 14 formed by the two adjacent base plate units 1. Continuous seal glues or seal taps may be coated in the accommodating groove 14 along the length direction of the base plate unit 1, so that the first groove fixing member 2 can be fixed in the accommodating groove 14. Along the length direction of the base plate unit 1, the first groove fixing member 2 may be designed as a structure of overlap joint or butt joint of several sections, or may also be designed as a continuous strip.

The cross-section shape of the first groove fixing member 2 is adapted to the shape of accommodating groove 14. Each corner of the lower end of the first groove fixing member 2 is chamfered to avoid an interference with the transition arc of the accommodating groove 14. The dimension of the chamfer depends on the dimension of the transition arc between the foot plate 12 and the base plate unit body 11. The lower surface of the first groove fixing member 2 is in contact with the upper surface of the foot plate 12. The two side surfaces of the first groove fixing member 2 are in contact with the side surfaces of the two base plate unit bodies 11. The upper surface of the first groove fixing member 2 is not lower than the upper surface of the base plate unit body 11. In this embodiment, the upper surface of the first groove fixing member 2 is higher than the upper surface of the base plate unit body 11. Preferably, the height difference between the upper surface of the first groove fixing member 2 and the upper surface of the base plate unit body 11 is 0 to 1 mm. In a preferable embodiment, the height difference is 0.5 mm.

As shown in FIG. 3, a plurality of nailhead-shaped (dome) projections are disposed on the two side surfaces of the first groove fixing members 2. The projections serve as sealing members 21, which are integrally formed on the first groove fixing member 2. The first groove fixing member 2 and the accommodating groove 14 are interference fit by the projections, so as to achieve a better sealing effect. The number of the projections can be designed to 1 to 3. The projections and the first groove fixing member 2 are formed integrally during the fabrication, which facilitates the process and fabrication.

Figure 4:
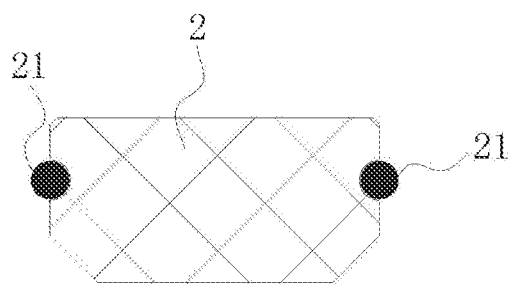
FIG. 4 is a schematic view of another sealing structure of a first groove fixing member in FIG. 2 of the present disclosure.

Referring to FIG. 4, in another structure, each of the two sides of the first groove fixing member 2 has a strip-shape recess, in which disposed an sealing glue strip as sealing member 21. The first groove fixing member 2 is tightly fitted to inner walls of the accommodating groove 14 by the resilience of the sealing glue strip. The sealing glue strip may be a vulcanized rubber sealing glue strip, a silicon rubber sealing glue strip, a chloroprene rubber adhesive sealing glue strip, a thermoplastic elastomer sealing glue strip, a TPV sealing glue strip or a PVC sealing glue strip etc.

Figure 5:
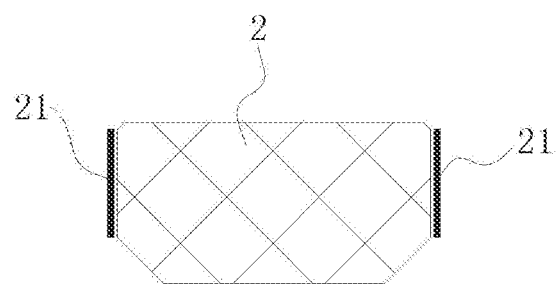
FIG. 5 is a schematic view of a third sealing structure of the first groove fixing member in FIG. 2 of the present disclosure.

Referring to FIG. 5, in further another structure, an elastomer as sealing member 21 is disposed on the each side surface of the first groove fixing member 2, and is coated on the each side surfaces of the first groove fixing member 2 considerably. Due to that the elastic member may elastically contact the inner walls of the accommodating groove 14, the first groove fixing member 2 is tightly jointed to the inner walls of the accommodating groove 14. The elastomer may be a sponge glue strip bonding to the first groove fixing member 2. The sponge glue strip may be made of EVA or PE foam substrate, a single face or both faces of which is coated by hot-melt PSA (pressure-sensitive adhesive). In other means, The elastomer may also be a material layer of polyurethane, polyurethane (urea) or polyurea sprayed onto the first groove fixing member 2.

Though using the above three structures, a better sealing effect can be achieved between the first groove fixing member 2 and the base plate unit 1, leading to achieve the function of water poof and preventing the base frame of the base plate from being eroded.

Referring to FIG. 2 and FIG. 3, after the base plate member disposed on the base frame, it is then fixed to the base frame by screws passing through the first groove fixing member 2 and the foot plate 12. The first groove fixing member 2 is completely accommodated in the accommodating groove 14 formed by joining base plate units 1, and the load it suffered is transferred to the foot plate 12 of the base plate unit 1, then to the base plate unit body 11 of the base plate unit 1, i.e., the base unit 1 finally bears all the load, while the first groove fixing member 2 only plays a role of supporting, fixing and transferring load. Therefore, it is unnecessary to ask a high requirement for the mechanical performance of the first groove fixing member 2 due to the connection manner of the base unit 1, avoiding the impact of the performance of the first groove fixing member 2 on the whole bearing capacity of the base plate member. The width of the first groove fixing member 2, that is the width of the accommodating groove 14, is not necessarily pretty large, and controlled in the range of 30 to 150 mm.

In the base plate member, one to three rows of screws are arranged in each first groove fixing member 2 along the splicing direction of the base plate units 1 to fix the first groove fixing member 2. Preferably, at least a row of screws pass through the foot plates 12 of the two adjacent base plate units 1 connected with the first groove fixing member 2 to allow a firm connection between the base plate units and the base frame. Preferably, compared with the conventional screws arrangement density on wooden base plate as 36 to 46 per/m$^2$, the screws are arranged as 16 to 20 per/m$^2$ on the base plate member, and the number of screw used may be reduced by 40% to 50%, which not only saves the cost of material and labor, but also avoids the initial damage to the base frame caused by high density screw holes.

The side fixing member 3 is used to connect the outermost base plate unit 1 to a side beam of the base frame, and the bottom surface of the side fixing member 3 is in contact with the base frame. There are mortises formed correspondingly on the two sides of the side fixing member 3 to fix the foot plates 12 of the base plate unit 1 to the side beams of the base frame. Depending on the different width of the side fixing member 3, one to four rows of screws may be disposed to fix it to base frame. The material, the surface treatment and the sealing structure of the side fixing member 3 may be the same as the first groove fixing member 2, so their descriptions are omitted.

The number and position of the second groove fixing member 4 depend on the structure of the base plate unit 1, and the middle of the base plate unit 1 is fixed to the base frame by the second groove fixing member 4 when the base plate unit 1 has a bigger width, so as to prevent the base plate member from arching upward and retain the flatness of the base plate member. The structure of the second groove fixing member 4 may refer to the structure first groove fixing member 2.

The dimension of the groove 114 on the base plate unit body 11 may be identical with the accommodating groove 14 formed by the foot plates 12 of two adjacent base plate units 1, accordingly, the dimensions of the first groove fixing member 2 and the second groove fixing member 4 are identical, so they can be formed as standard components and easy to be fabricated and mounted.

Figure 6:
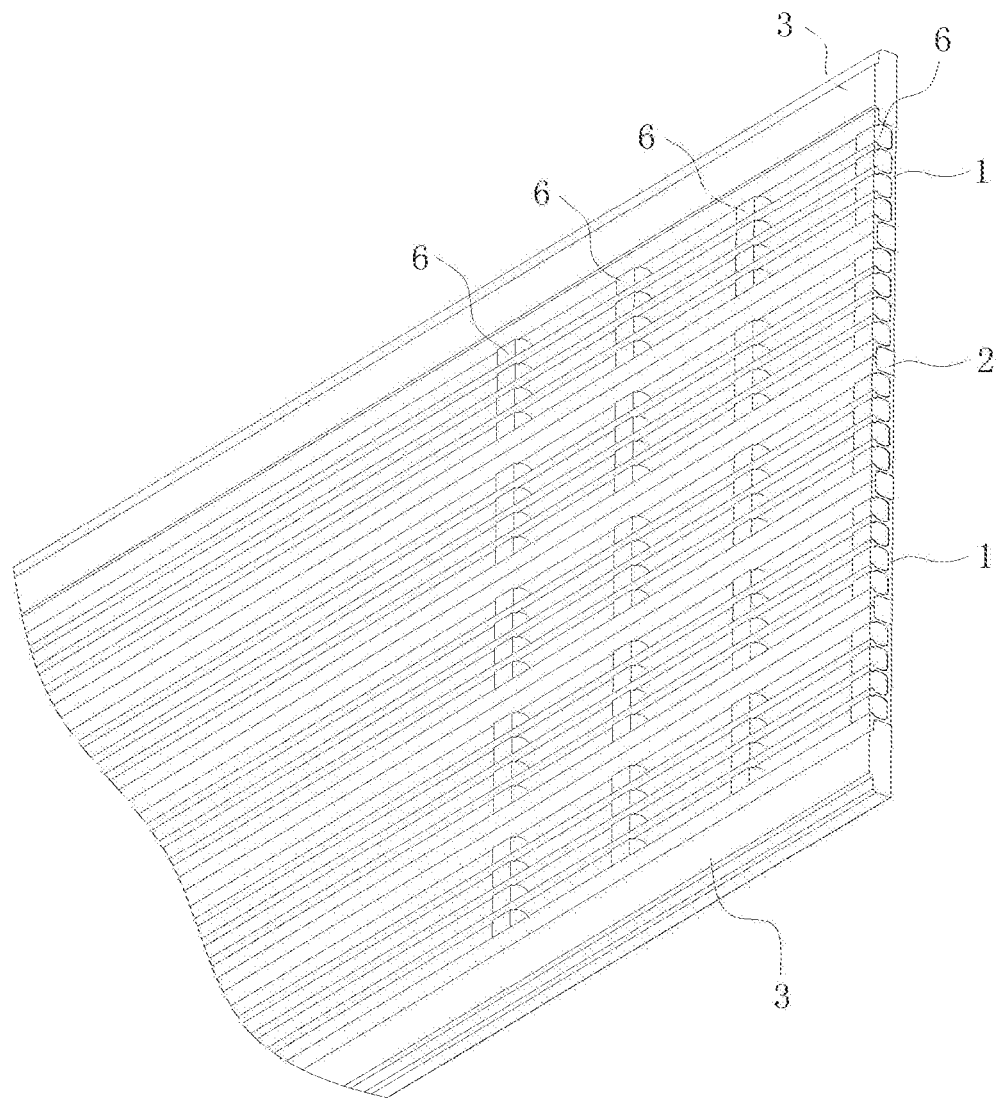
FIG. 6 is a schematic view showing the base units according the first embodiment of the present disclosure being spliced as a base plate component from back.

Referring to FIG. 6, as a cavity is formed between the two adjacent web plates of the bearing part 111. After the base plate member is formed by splicing the base plate units 1, the part of the base plate member close to the end subjects to multi-frequency fatigue stress, and the base plate member is apt to be damaged. In this embodiment, it is preferable to dispose end fillings 6 to the cavities close to the ends, so as to enhance the fatigue resistance of the base plate member. The end fillings 6 are filled in the both longitudinal ends of the base plate unit body 11 along the length direction of the base plate unit body 11 at intervals. The filling range is approximately within 3 m from the end face of the base plate unit body 11, that is, the end fillings 6 are distributed in the region within 3 m from the end face of the base plate unit body 11 at intervals. The cross section of the end filling 6 depends on the cross section of the cavity in the base plate unit body 11. In this embodiment, the end filling 6 is filled between the two adjacent web plates of the bearing part 111. The length of the end filling 6 is 20 to 50 mm. The location of the end filling 6 corresponds to the base transversal beam of the base frame, and the interval between the two adjacent end fillings 6 depends on the interval between bottom transversal beams of the base frame, for example, about 100 to 400 mm. After the base plate member is disposed on the base frame, the end fillings 6 are on the bottom transversal beams of the base frame, leading to enhance the fatigue resistance of the base plate member and avoid the damage due to the multi-frequency fatigue stress on the end of the base plate member. The interval arrangement of the end fillings 6 may reduce the weight and the cost.

In another embodiment, the end fillings 6 may also be continuously filled along the length direction of the base plate unit body 11. The filling range of the end fillings 6 is within 3 m from the end face of the base plate unit body 11.

Second Embodiment

Figure 7:
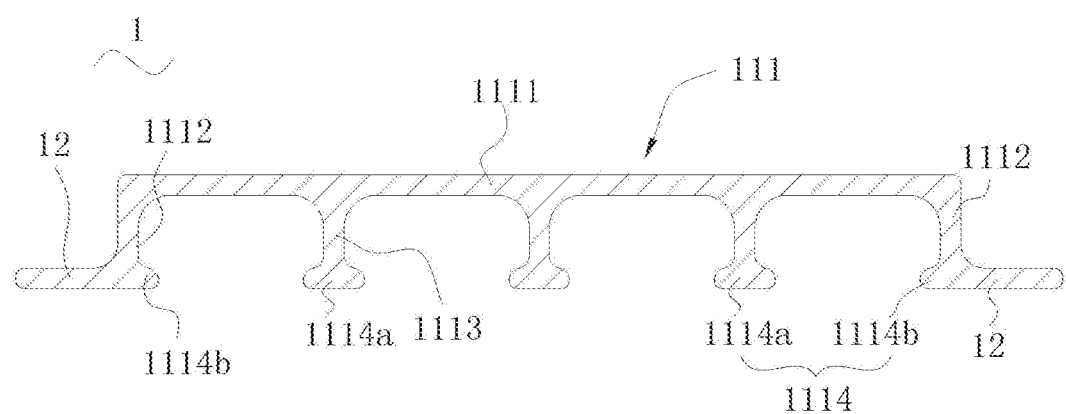
FIG. 7 is a schematic view of a base unit according to a second embodiment of the present disclosure.

Referring to FIG. 7, the base plate unit body of the base plate unit 1 of a second embodiment simply has a bearing part 111, which structure is identical with the bearing part 111 of the first embodiment and also includes a panel 1111, side-web plates 1112, middle web plates 1113 and bottom supports 1114. No groove is formed on the base plate unit body of the base plate unit 1, so the groove fixing member of the first embodiment has been omitted correspondingly.

The foot plates 12 of the base plate unit 1 extend outwards from the bottoms of the two side-web plates 1112 of the bearing part 111. When the base plate unit 1 is spliced and joined to a base plate member, as done in the first embodiment, the foot plates 12 of two adjacent base plate unit 1 encloses an accommodating groove, in which a first groove fixing member is disposed and is fixed by screws. Compared with the first embodiment, more base plate units 1 of the present embodiment will be needed to form the base plate member with the same width in this embodiment.

The dimensions and parameters of the base plate unit in this embodiment may refer to the first embodiment, so no more detail is repeated here.

Third Embodiment

Figure 8:
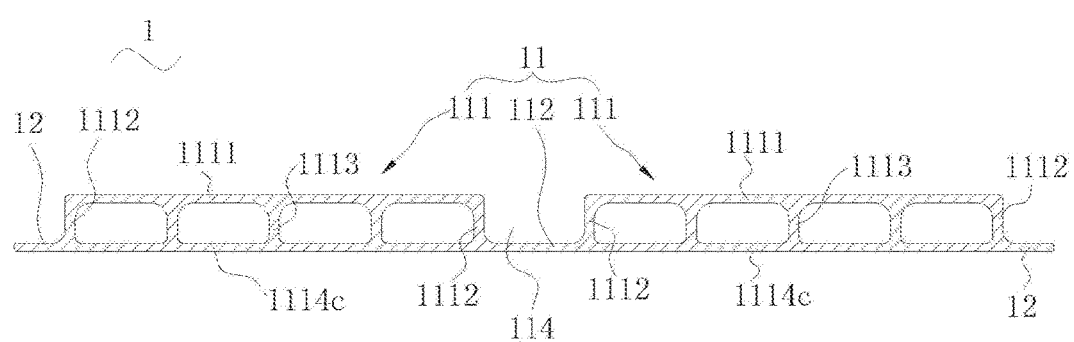
FIG. 8 is a schematic view of a base unit according to a third embodiment of the present disclosure.

FIG. 8 shows the structure of the base plate unit 1 according to a third embodiment, and the base plate unit body 11 of the base plate unit 1 has two bearing parts 111, each including panels 1111, side-web plates 1112, middle web plates 1113 and bottom supports. The adjacent side-web plates 1112 of the two bearing parts 111 are connected to each other by the bottom connecting plate 112, to form the groove 114. The foot plates 12 of the base plate unit 1 extend outwards from the bottoms of other side-web plates 1112 of the two bearing parts 111.

Unlike the first embodiment, in the present embodiment the bottom supports of the bearing parts 111 are plat supports 1114c, which connect the bottom connecting plate 112 with two foot plates 12 to form an integral structure. Each lower end of the middle web plates 1113 is connected to the panel support 1114c, the bearing part 111 of this embodiment has a better bearing capacity than the bottom support 1114 including the foot support 1114a, 1114b in the first embodiment.

Preferably, the thickness of the panel support 1114c is 4 to 6 mm, most preferably 4.5 to 5 mm. Other dimensions and parameters of the bearing part may refer to the first embodiment.

Fourth Embodiment

Figure 9:
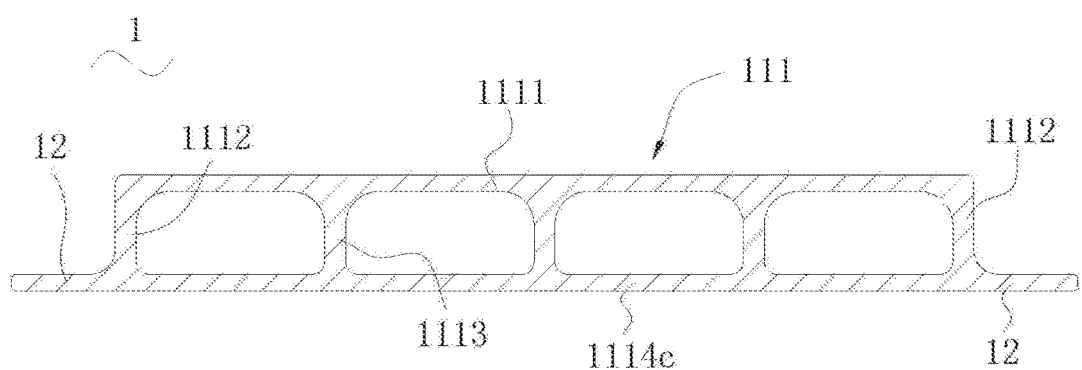
FIG. 9 is a schematic view of a base unit according to a fourth embodiment of the present disclosure.

Referring to FIG. 9, unlike the third embodiment, in a fourth embodiment the base plate unit body of the base plate unit 1 simply has a bearing part 111, which structure is identical with the bearing part 111 of the third embodiment.

In this embodiment, the connection between the foot plates 12 of the base plate unit 1 and the base plate unit body is identical with that of the second embodiment; accordingly, the combination of a plurality of base plate units and the first groove fixing members to form the base plate member is identical with that of the second embodiment.

Fifth Embodiment

Figure 10:
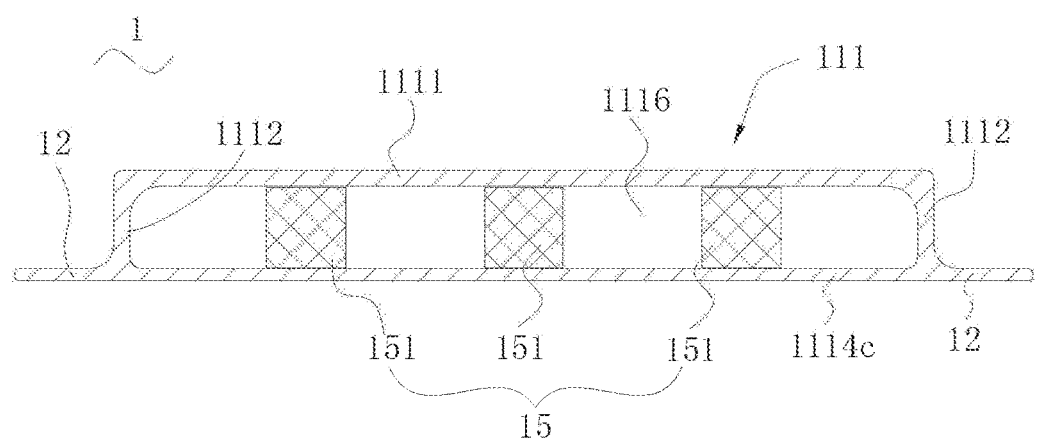
FIG. 10 is a schematic view of a base unit according to a fifth embodiment of the present disclosure.

Referring to FIG. 10, the base plate unit 1 of a fifth embodiment includes a base plate unit body, foot plates 12 and cavity fillings 15. The base plate unit body of the base plate unit 1 and the foot plates 12 are an integral structure made of fiber reinforced polymer-matrix composite, and the cavity fillings 15 are independent of the integral structure.

In this embodiment, the base plate unit has a bearing part 111. Unlike the fourth embodiment, the bearing part 111 of this embodiment has no middle web plate, while its panel 1111, two side-web plates 1112 and the panel supports 1114c enclose a cavity 116 with a rectangle-shaped cross section. The foot plates 12 extend outward from the bottoms of the two side-web plates 1112, and are integrated to the panel supports 1114c. The height of the cavity 1116 may be 5 to 60 mm, and the width thereof may be 50 to 450 mm.

The cavity fillings 15 are adaptively mounted in the cavity 1116 of the bearing part 111, in order to provide high supporting and shearing strength, enhance the compressive strength and fatigue resistance of the base plate unit, and improve the bearing capacity of the base plate unit. The cavity filling 15 is made of one or more of wood, plastic, metal or composite, wherein wood includes wooden plywood, solid wood integrated composite plate, bamboo-wood composite plate, composite plate formed by oriented strandboards (OSB), wood/bamboo veneers, etc. The length of the cavity filling 15 may be designed to 1 to 10 mm depending on the material and processing, and be adapted to the length of the base plate unit body. The cross section of the cavity filling 15 is designed to meet the strength requirement, and the cavity filling 15 may be a hollow member or solid member.

In this embodiment, the cavity filling 15 has three longitudinal beams 151 and transversal beams (not shown) transversally connected between the longitudinal beams 151. The longitudinal beams 151 are disposed in the cavity 1116 along the width direction of the bearing part 111 at intervals. Each of the longitudinal beam 151 and the transversal beam may be a hollow beam or a solid beam. In this embodiment, the longitudinal beam 151 is a solid beam with a rectangle cross section, and contacts the panel 111 and the panel support 1114c at its upper surface and lower surface respectively. The longitudinal beams 151 are connected by transversal beams, so that the cavity fillings 15 are easy to be mounted in the cavity 1116. Preferably, the transversal beams are connected to respective ends of longitudinal beams 151, and both ends of the transversal beam contact and abut against the two side-web plates 1112 of the bearing part 111, so that the cavity fillings 15 are positioned in the cavity 1116. Preferably, the cavity filling 15 of this embodiment is made of wood, which is easy to process, has a low cost, and has a good performance as well.

Compared with the structures in the first to fourth embodiments, the base plate unit 1 in this embodiment is simple, easy to process and mold. It is able to get the better supporting effect and shearing strength through cavity fillings 15 replacing middle web plates. The cavity fillings 15 may be made of scraps left after processing or low cost material, and the cost is much lower.

Sixth Embodiment

Figure 11:
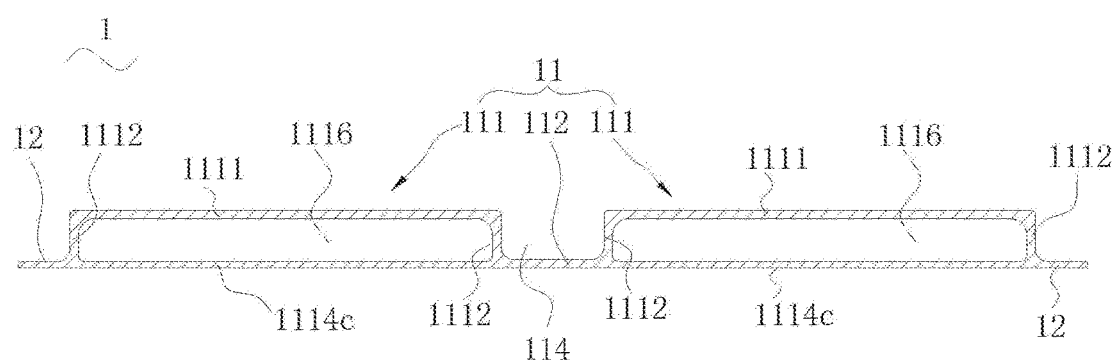
FIG. 11 is a schematic view of a base unit according to a sixth embodiment of the present disclosure.

Referring to FIG. 11, unlike the fifth embodiment, in a sixth embodiment the base plate unit body 11 of base plate unit 1 has two bearing parts 111. The panel 1111, the side-web plates 1112, the panel supports 1114c of each bearing part 111 enclose a cavity 116 with a rectangle-shaped cross section.

Cavity fillings (not shown in FIG. 11) are disposed in two cavities 1116 of the base plate unit 1. The structure and arrangement of the cavity filling may refer to the fifth embodiment.

The connection manners between the two bearing parts 111 and between foot plates 12 and the bearing parts 111 may refer to the third embodiment, accordingly, the combination of a plurality of base plate units 1 and the first groove fixing members to form the base plate member may refer to the third embodiment.

Seventh Embodiment

Figure 12:
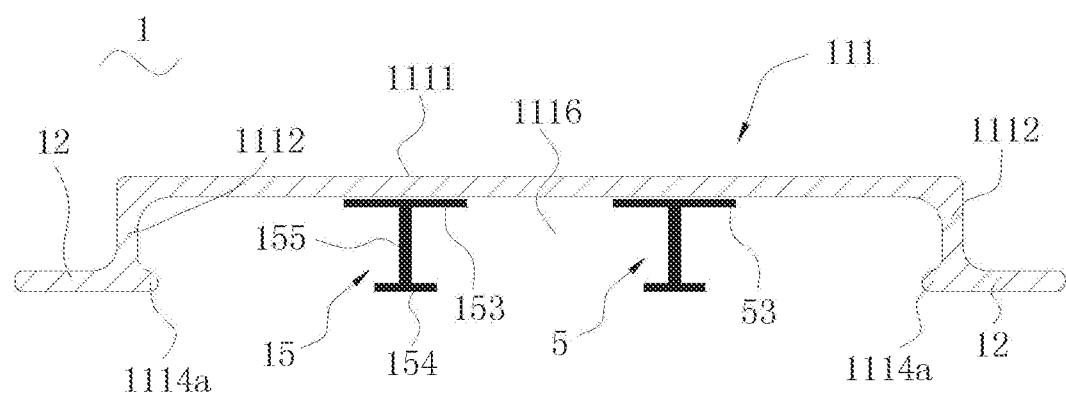
FIG. 12 is a schematic view of a base unit according to a seventh embodiment of the present disclosure.

Referring to FIG. 12, unlike the fifth embodiment, in a seventh embodiment no planar support is arranged on the bearing part 111 of the base plate unit 1—, while two side-foot supports 1114a are formed by extending the bottoms of the two side-web plates 1112 inward in the horizontal direction. There is an interval between the two side-foot supports 1114a. The panel 1111, the two side-web plates 1112, the two side-foot supports 1114a of the bearing part 111 enclose a cavity 116 open to the bottom. The foot plates 12 extend outwards from the bottoms of the two side-web plates 1112.

Cavity fillings 15 are also disposed in the cavity 1116 in this embodiment, to provide supporting and shearing strength. The cavity fillings 15 contact the lower surface of the panel 1111 and support the panel 1111, and the lower surfaces of the cavity fillings 15 are flush with the lower surfaces of the foot plates 12.

According to this embodiment, the cavity filling 15 is an I-shaped support beam including an upper flange 153, a lower flange 154 and a vertical plate 155 connecting the upper flange 153 and the lower flange 154. The upper flange 153 supports the lower surface of the panel 1111, and the extension dimension of the upper flange 153, that is, the width of the upper flange 153, is preferable 15 to 150 mm, to transfer the load of the panel 1111 evenly. In order to avoid a rigid contact between the upper flange 153 and the lower surface of the panel 1111, the top surface of the upper flange 153 is preferably bonded with a foam layer or sprayed with an elastomer layer. Preferably, the I-shaped support beam is made of metal or composite, but metal is most favorable due to its excellent bearing strength. The I-shaped support beam is disposed on the base frame by welding or bonding.

The structure of the cavity filling 15 of this embodiment may also be applied to the fifth embodiment and the sixth embodiment, similarly, the cavity filling 15 of the fifth embodiment may also be applied to this embodiment.

Eighth Embodiment

Figure 13:
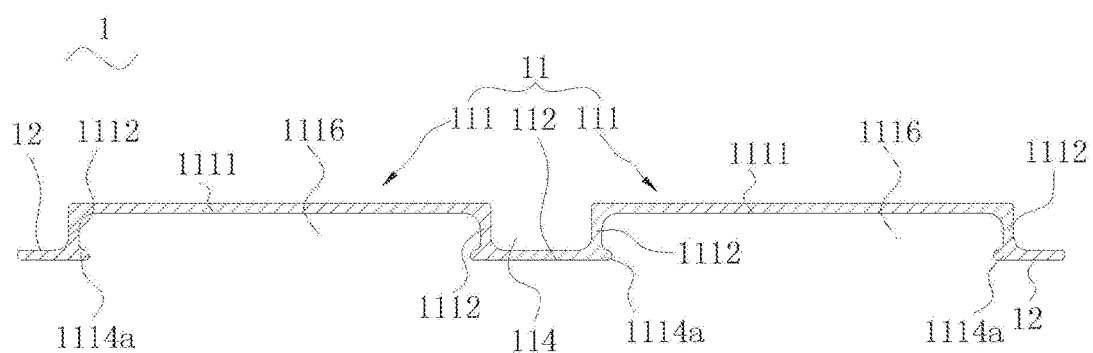
FIG. 13 is a schematic view of a base unit according to an eighth embodiment of the present disclosure.

Referring to FIG. 13, unlike the seventh embodiment, in an eighth embodiment the base plate unit body 11 of the base plate unit 1 has two bearing parts 111, between which is connected a connecting plate 112a and is formed a groove 114. Each bearing part 11 includes a cavity 116 open to the bottom, accordingly, cavity fillings (not shown in FIG. 13) may be disposed in each cavity 1116, the detail of which may refer to the seventh embodiment.

Ninth Embodiment

Figure 14:
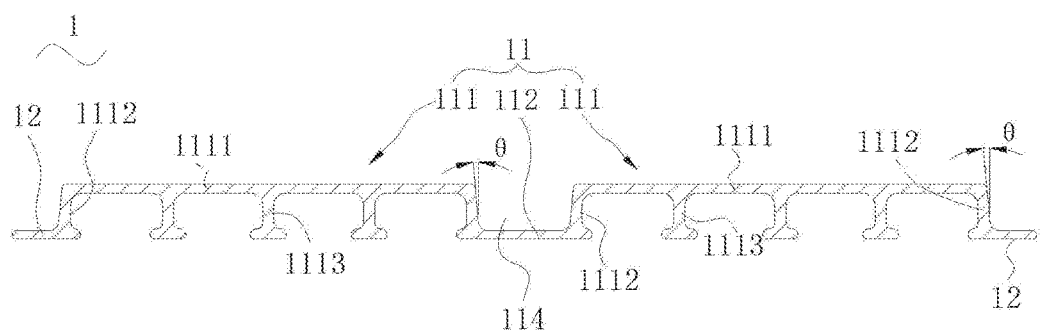
FIG. 14 is a schematic view of a base unit according to a ninth embodiment of the present disclosure.

Referring to FIG. 14, unlike the first embodiment, in a ninth embodiment the outer surfaces of the two side-web plates 1112 of the bearing part 111 of the base plate unit body 11 are inclined planes, which incline gradually outwards from top to bottom, so that the outline of the bearing part 111 forms a trapezoid having a narrower top and a wider bottom, but the outline of the groove 114 between the two bearing parts 111 is a wide opening trapezoid having a wider top and a narrower bottom. Accordingly, the second groove fixing member 4 (not shown) adapted to the groove 14 also has a trapezoid shape having a wider top and a narrower bottom.

Figure 15:
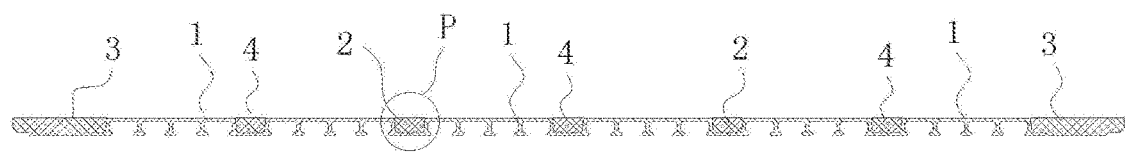
FIG. 15 is a schematic view showing the base units according to the ninth embodiment of the present disclosure being spliced as a base plate member.
Figure 16:
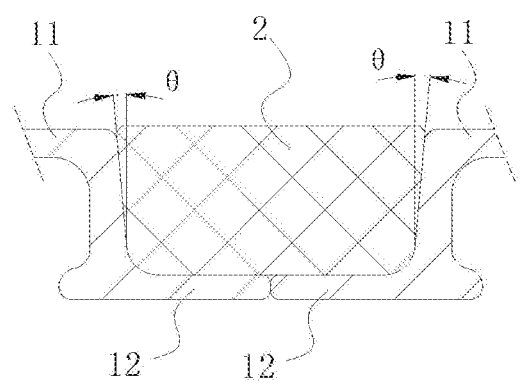
FIG. 16 is an enlarged partial view showing a portion P in FIG. 15 of the present disclosure.

Referring to FIGS. 15 and 16, when the base plate units 1 are joined and spliced to a base plate member, the accommodating groove 14 formed by two adjacent base plate units 1 is formed as a trapezoid shape having a wider top and a narrower bottom. Adaptively, the shape of the first groove fixing member 2 is also formed as a trapezoid.

The inclination of the outer surface of the side-web plate of the base plate unit could not only facilitate the installation of the groove fixing members, but also make the groove fixing members and the base plate unit tightly fit, and enhances the sealing performance of the base plate system.

The inclination angle $\theta$ of the outer surface of the side-web plate 1112 is less than or equal to 15° relative to the vertical plane, preferably, less than or equal to 8°. The inclination angle $\theta$ of the two side faces of the first groove fixing member 2 and the second groove fixing member 4 is also $\theta$ relative to the vertical plane.

Tenth Embodiment

Figure 17:
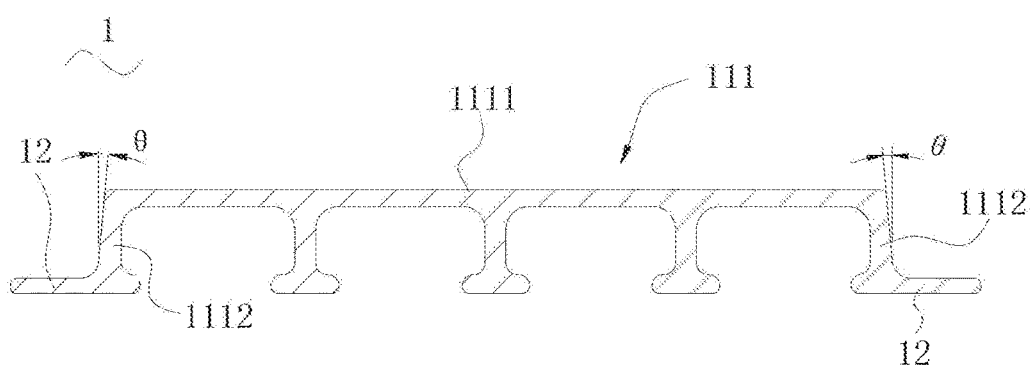
FIG. 17 is a schematic view of a base unit according to a tenth embodiment of the present disclosure.

Referring to FIG. 17, unlike the ninth embodiment, in a tenth embodiment the base plate unit body 11 only has a bearing part 111, which is identical with that of the ninth embodiment.

The connection manner of the base plate units 1 of this embodiment joined and spliced to the base plate member may refer to the second embodiment.

The outer inclined surfaces of the two side-web plates 1112 of the bearing part 111 in the ninth and tenth embodiments may also be applied to the third to eighth embodiments. This inclination design may enhance self-sealing performance of the base plate unit.

Although the invention has been described with reference to several exemplary embodiments, it is understood that the terms that have been used are terms of descriptive and illustrative, rather than limited. As the present invention may be embodied in several forms without departing from the spirit or essential characteristics thereof, it should also be understood that the above-described embodiments are not limited by any of the details of the foregoing description, unless otherwise specified. Rather, the above described embodiments should be construed broadly within the spirit and scope of the present invention as defined in the appended claims. Therefore, all modifications and variations falling in the scope of the claims or its equivalent should be embraced by the appended claims.

What is claimed is:
1. A base plate unit, wherein the base plate unit is of an integral structure made of fiber reinforced polymer-matrix composite material, and the base plate unit comprises:
   a base plate unit body comprising at least one bearing part, each bearing part comprising a panel, a plurality of web plates extending downwards from a bottom of the panel, and bottom supports disposed at lower ends of the web plates, the web plates comprising two side-web plates at both sides of the panel and middle web plates in the middle; and
   foot plates disposed at both exterior sides of a bottom of the base plate unit body, and formed by extending bottoms of respective outmost side-web plates of the base plate unit body outwards horizontally;
   wherein a width F of the panel of each bearing part is 50 to 450 mm, and a thickness A of the panel is 3 to 8 mm;
   a thickness B of each of the side-web plates and the middle web plates is 4 to 7 mm; a thickness G of the foot plate is 3 to 7 mm, and a width E of the foot plate is 15 to 40 mm.

2. The base plate unit according to claim 1, wherein the base plate unit body comprises a plurality of bearing parts arranged transversally at intervals, and bottom ends of the side-web plates of adjacent bearing parts are connected integrally by a bottom connecting plate, which together with the side-web plates of adjacent bearing parts enclose a groove that is filled a groove fixing member.

3. The base plate unit according to claim 2, wherein a width of the groove fixing member is 30 to 150 mm.

4. The base plate unit according to claim 1, wherein outer surfaces of the two side-web plates of the bearing part are vertical planes, or inclined planes which is inclined gradually outwards from top to bottom, and an inclination angle of the outer surfaces of the side-web plates is 0 to 15° relative to the vertical plane.

5. The base plate unit according to claim 4, wherein the inclination angle of the outer surfaces of the side-web plates is 0 to 8° relative to the vertical plane.

6. The base plate unit according to claim 1, wherein the bottom supports are foot supports comprising a plurality of side-foot supports formed by extending a bottom of each side-web plate inwards horizontally; and a plurality of middle foot supports formed by extending a bottom edge of each middle web plate towards both sides horizontally, lower surfaces of foot supports being flush with lower surfaces of foot plates, and a width C of the middle foot support is 10 to 30 mm, a thickness D of each of the side-foot supports and the middle foot supports is 4 to 6 mm.

7. The base plate unit according to claim 6, wherein the width C of the middle foot support is 15 to 25 mm, the thickness D of each of the side-foot supports and the middle foot supports is 4.5 to 5 mm.

8. The base plate unit according to claim 7, wherein the width F of the panel is 200 to 300 mm, and the thickness A of the panel is 4 to 5 mm; the thickness B of each of the side-web plates and the middle web plate is 4 to 6 mm; the thickness G of the foot plate is 3 to 5 mm, and the width E of the foot plate is 15 to 28 mm.

9. The base plate unit according to claim 1, wherein the bottom supports are planar supports that are connected to both foot plates to form an integral structure, lower ends of the middle web plates are connected to the planar supports, and a thickness of the planar support is 4 to 6 mm.

10. The base plate unit according to claim 9, wherein the thickness of the planar support is 4.5 to 5 mm.

11. The base plate unit according to claim 1, wherein an interval between two adjacent web plates is 30 to 100 mm.

12. A base plate unit comprising:
a base plate unit body comprising at least one bearing part, each bearing part comprising a panel and two side-web plates extending downwards from a bottom of the panel, the panel and the side-web plates forming a cavity;
foot plates disposed at both exterior sides of a bottom of the base plate unit body, and formed by extending bottoms of respective outmost two side-web plates of the base plate unit body outwards horizontally, lower surfaces of the foot plates being flush with lower surfaces of bottom supports; and
a cavity filling mounted in the cavity of the base plate unit body;
wherein the base plate unit body and the foot plates are formed integrally and are made of fiber reinforced polymer-matrix composite, the cavity filling being formed separately.

13. The base plate unit according to claim 12, wherein the base plate unit body comprises a plurality of bearing parts arranged transversally at intervals, and bottom ends of the side-web plates of adjacent bearing parts are integrally connected by a bottom connecting plate, which together with the side-web plates of adjacent bearing parts enclose a groove that is filled a groove fixing member.

14. The base plate unit according to claim 13, wherein a width of the groove fixing member is 30 to 150 mm.

15. The base plate unit according to claim 12, wherein an inclination angle of the outer surfaces of the two side-web plates of the bearing part is 0 to 15° relative to a vertical plane, and the outer surface is inclined gradually outwards from top to bottom.

16. The base plate unit according to claim 15, wherein the inclination angle of the outer surfaces of the side-web plates is 0 to 8° relative to the vertical plane.

17. The base plate unit according to claim 12, wherein foot supports are disposed at inner sides of bottom ends of the side-web plates, which are formed by extending bottoms of the side-web plates inwards horizontally; the two foot supports have interval to form an opening at the bottom of the cavity; the cavity filling supports a lower surface of the panel, and a lower surface of the cavity filling is flush with lower surfaces of foot supports.

18. The base plate unit according to claim 17, wherein the cavity filling is an I-shaped support beam comprising an upper flange, a lower flange and a vertical plate connecting the upper flange and the lower flange, the upper flange supporting the lower surface of the panel, the cavity filling made of metal or composite material.

19. The base plate unit according to claim 18, wherein a foam or elastomer is disposed between a top surface of the upper flange and the panel.

20. The base plate unit according to claim 18, wherein a width of the upper flange is 15 to 150 mm.

21. The base plate unit according to claim 12, wherein a planar support is connected between the bottom ends of the two side-web plates of the bearing part and is connected to the two foot plates to form an integral structure, and the planar support, the side-web plates and the panel enclose the cavity.

22. The base plate unit according to claim 21, wherein the cavity filling comprises a plurality of longitudinal beams and transversal beams transversally connecting the longitudinal beams, and a top surface and lower surface of each longitudinal beam are in contact with a lower surface of the panel and the planar support respectively.

23. The base plate unit according to claim 22, wherein the transversal beams are connected to ends of the longitudinal beams, and both ends of the transversal beam abut against the two web plates of the bearing part.

24. The base plate unit according to claim 22, wherein the cavity filling is made of wood.

25. The base plate unit according to claim 12, wherein the cavity filling is made of wood, plastic, metal or composite material.

26. The base plate unit according to claim 12, wherein the material of the cavity filling is distinct from the material of the base plate unit body.

* * * * *